United States Patent
Kawajiri

(10) Patent No.: US 9,811,770 B2
(45) Date of Patent: Nov. 7, 2017

(54) IMAGE FORMING APPARATUS FOR IMPROVING POWER SAVING EFFECT, AND CONTROL METHOD THEREOF

(71) Applicant: CANON KABUSHIKI KAISHA, Tokyo (JP)

(72) Inventor: Kensuke Kawajiri, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/163,772

(22) Filed: May 25, 2016

(65) Prior Publication Data

US 2016/0350636 A1 Dec. 1, 2016

(30) Foreign Application Priority Data

May 29, 2015 (JP) .................................. 2015-109652

(51) Int. Cl.
*G06K 15/00* (2006.01)
(52) U.S. Cl.
CPC .............................. *G06K 15/4055* (2013.01)
(58) Field of Classification Search
None
See application file for complete search history.

(56) References Cited

U.S. PATENT DOCUMENTS

| 8,533,509 B2 | 9/2013 | Kamijima | |
|---|---|---|---|
| 2012/0131367 A1* | 5/2012 | Kamijima | H02J 7/0021 713/323 |
| 2015/0138593 A1* | 5/2015 | Iizuka | H04N 1/00891 358/1.15 |

FOREIGN PATENT DOCUMENTS

JP 2012108032 A 6/2012

* cited by examiner

*Primary Examiner* — Andrew H Lam
(74) *Attorney, Agent, or Firm* — Rossi, Kimms & McDowell LLP

(57) ABSTRACT

An image forming apparatus dynamically determines the next communication timing with a server to thereby increase a power saving effect by preventing unnecessary release of the power saving state. The image forming apparatus having a first power state and a second power state in which power is saved more than in the first power state, and having a plurality of functions of periodically communicating with an external apparatus. A remaining time before the image forming apparatus next communicates with the external apparatus is calculated for each of the plurality of functions of periodically communicating with the external apparatus. There is set, in a timer, the shortest one from among the calculated plurality of remaining times. A power state of the image forming apparatus transits from the second power state to the first power state according to the remaining time set in the timer.

15 Claims, 12 Drawing Sheets

IMAGE FORMING APPARATUS FOR IMPROVING POWER SAVING EFFECT, AND CONTROL METHOD THEREOF

BACKGROUND OF THE INVENTION

Field of the Invention

The present invention relates to an image forming apparatus for improving a power saving effect, and a control method thereof.

Description of the Related Art

Conventionally, an image forming apparatus such as a printing apparatus for printing and outputting data can be normally operated with a power state of the apparatus set to a sleep state (a power saving state) in which power supply to unused portions is stopped in order to realize power saving. In the sleep state, it is required that the power state of the apparatus periodically returns to a normal state (a non-power-saving state) from the sleep state for the purpose of detecting the operation of a touch panel or the pressing of a key, or for the purpose of a periodic communication process with a server. In general, compared to the periodic communication process with the server, it is required that the power state of the apparatus returns to the normal state in a short interval (for example, 200 ms) in order to appropriately detect the operation of the touch panel or the key. Accordingly, a time interval for periodical transition from the sleep state to the normal state is generally set to an appropriate fixed value on a condition that the operation of the touch panel or the key is detected. Therefore, frequent release of the sleep state deteriorates the effect of power saving.

However, depending on the configuration of the apparatus, when the time interval for returning the power state of the apparatus to the normal state from the sleep state is uniformly set to a fixed value, the frequency of the return to the normal state may be increased more than necessary. For example, in the conventional image forming apparatus, there is known an apparatus which includes only physical operational keys and LEDs without a display panel. Such an apparatus can generally instruct the setting of the apparatus and display the state of the apparatus, using a UI application operating on a PC (personal computer).

In this way, in the case of the apparatus having no display panel, particularly the number of operational keys is small, so that all the keys can be assigned to interruption ports. In such a case, there is no need to cause the power state of the apparatus to transition from the sleep state to the normal state only for detecting a key pressing. In this case, the time for the return to the normal state is necessarily set to an appropriate value paying attention to a periodic communication process with the server. At that time, the appropriate value is changed depending on a setting by a user or a communication status of the apparatus with the server. Accordingly, the apparatus transitions to the normal state at an unnecessary timing only by setting the time interval to a fixed value, which may disable to achieve a power saving effect.

By the way, Japanese Laid-Open Patent Publication (Kokai) No. 2012-108032 discloses a technique of setting a shorter time taken for complete discharge as a time for the return from a power saving mode, based on a remaining amount of a secondary battery and a discharge current value. However, in this technique, the setting value for the return is a fixed value and is not set taking a status of use of a network into consideration, which may further improve the power saving effect.

SUMMARY OF THE INVENTION

The present invention provides an image forming apparatus, and a control method thereof, which dynamically determines the next communication timing with a server to thereby increase a power saving effect by preventing unnecessary release of the power saving state.

Accordingly, an aspect of the present invention provides an image forming apparatus having a first power state and a second power state in which power is saved more than in the first power state, and having a plurality of functions of periodically communicating with an external apparatus, the image forming apparatus comprising: a calculation unit configured to calculate a remaining time before the image forming apparatus next communicates with the external apparatus, for each of the plurality of functions of periodically communicating with the external apparatus; a setting unit configured to set, in a timer, the shortest one from among the plurality of remaining times calculated by the calculating unit; and a transition unit configured to cause a power state of the image forming apparatus to transit from the second power state to the third power state according to the remaining time set in the timer.

According to the invention, the next communication timing with the server is dynamically determined to thereby increase a power saving effect by preventing unnecessary release of the power saving state.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
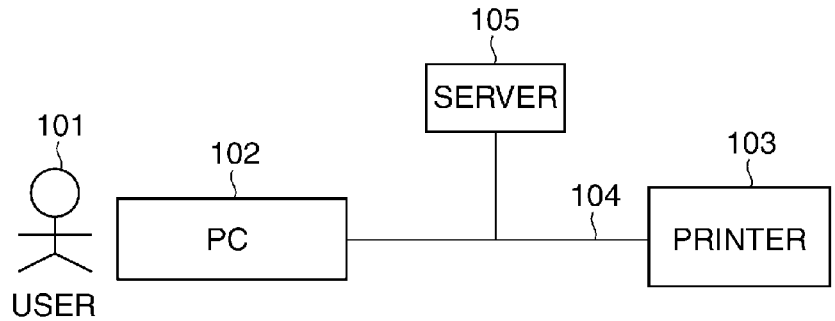
FIG. 1 is a block diagram schematically showing the entire configuration of an image forming system which includes an image forming apparatus according to an embodiment of the invention.

FIG. 1 is a block schematically showing the configuration of an image forming system which includes an image forming apparatus according to an embodiment of the invention.

An image forming system of FIG. 1 includes a printer 103 as an image forming apparatus, a PC (personal computer) 102 as an information processing apparatus, and a server 105, all of which are connected through a network 104. The network 104 connecting the printer 103 and the PC 102 with each other includes a wireless LAN, a wired LAN, or a USB. The network 104 connecting the server 105 to the printer 103 and the PC 102 includes a wireless LAN or a wired LAN.

A user 101 can adjust various types of settings or issue a command to the printer 103 by operating a UI application 401 (described below using FIG. 4) operated by the PC 102. In addition, the UI application 401 can display the status of the printer 103 on the PC 102.

Figure 2:
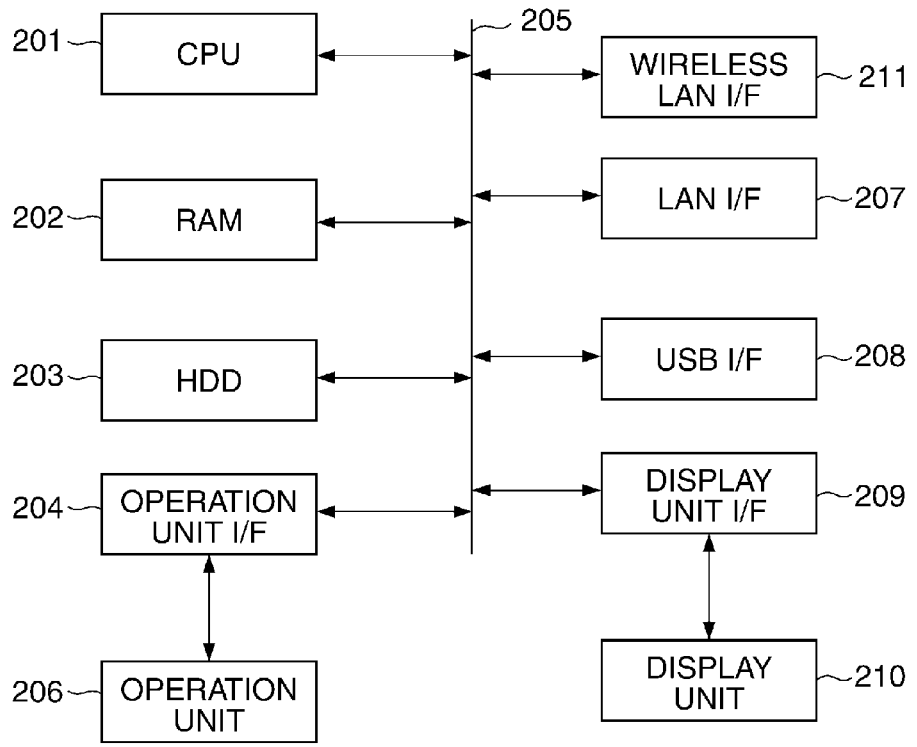
FIG. 2 is a block diagram showing a hardware configuration of a PC in FIG. 1.

FIG. 2 is a block diagram showing a hardware configuration of the PC 102 in FIG. 1. Hereinafter, the "interface" may be denoted as "I/F".

In FIG. 2, a CPU 201 is a processor which controls the whole of the entire PC 102. A RAM 202 is a system work memory for the operation of the CPU 201, and also used as a program memory for the storage of a program. A HDD 203 is a data storage region. An operation unit I/F 204 serves to receive an input signal from an operation unit 206, and delivers to the CPU 201 information input through the operation unit 206 by the user 101.

A display unit I/F 209 outputs a signal to a display unit 210 according to a control of the CPU 201. A USB I/F 208 is a functional unit for the connection to a USB device, and used to acquire a status of another device and return the status through the USB. A LAN I/F 207 is a functional unit for the connection to the wired LAN, and used to acquire a status of another device and return the status through the wired LAN. A wireless LAN I/F 211 is a functional unit for the connection to the wireless LAN, and used to acquire a status of another device and return the status through the wired LAN. The devices described above are disposed on a system bus 205.

Figure 3:
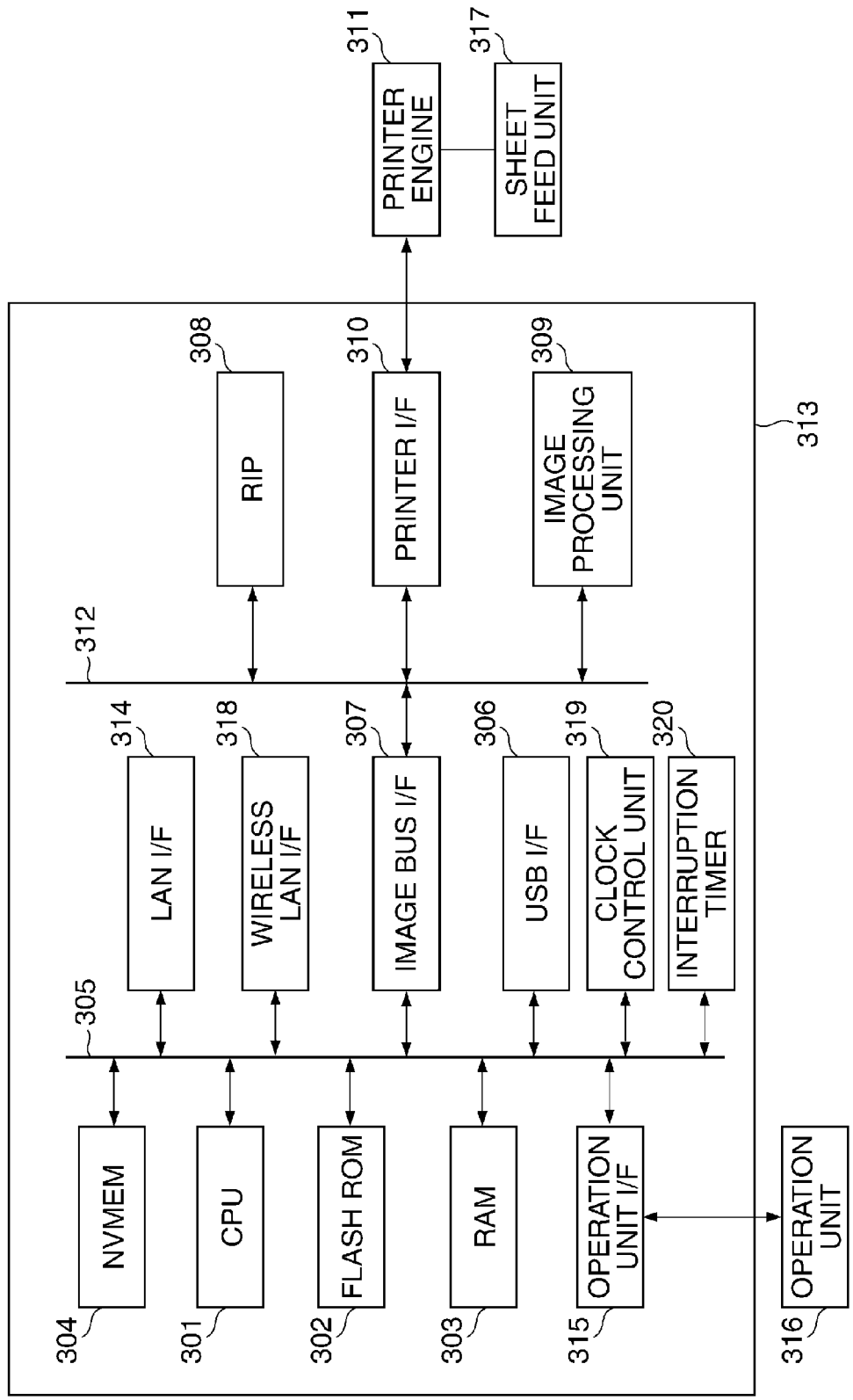
FIG. 3 is a view showing a hardware configuration of a printer which is operated by the PC in FIG. 1.

FIG. 3 is a diagram showing a hardware configuration of the printer 103 in FIG. 1.

In FIG. 3, the printer 103 includes a controller unit 313, a printer engine 311, an operation unit 316, and a sheet feed unit 317. The operation unit 316 includes keys for the operation of the devices and a plurality of LEDs (described below using FIG. 5) indicating the states of the devices. The sheet feed unit 317 stores sheets, and feeds the sheet when the printer engine 311 performs a printing.

The controller unit 313 is connected to the printer engine 311 serving as an image output device to input or output image data and device information. In the controller unit 313, a CPU 301 is a processor which controls the entire system in the printer 103. A flash ROM 302 is a writable non-volatile memory for the storage of various types of control programs for controlling the system. A RAM 303 is a system work memory for the operation of the CPU 301, and is also a program memory for recording a program or an image memory for temporarily storing image data.

A NVMEM (Non Volatile Memory) 304 is a non-volatile memory, and stores setting information. A USB I/F 306 enables a USB connection with the PC 102. An image bus I/F 307 is a bus bridge which converts a data structure, and connects a system bus 305 with an image bus 312 through which image data is transmitted at a high speed. An operation unit I/F 315 is an interface unit with the operation unit 316, transmits control information to the LED of the operation unit 316, and delivers to the CPU 301 the information input from the operation unit 316 by the user 101.

A LAN I/F 314 enables a wired LAN connection with the PC 102. A wireless LAN I/F 318 enables a wireless LAN connection with the PC 102. The controller unit 313 can also communicate with the server 105 through the LAN I/F 314 or the wireless LAN I/F 318. Further, a plurality of servers 105 may be provided. The server 105 includes an SNTP (Simple Network Time Protocol) server, a DDNS (Dynamic Domain Name System) server, a DNS server, and a cloud server.

A clock control unit 319 is controlled by the CPU 301, and supplies clocks necessary for the operation of the respective units in the controller unit 313. An interruption timer 320 issues a timer interruption at a time designated from the CPU 301, and informs the timer interruption to the clock control unit 319. The above-described devices are disposed on the system bus 305.

The image bus 312 is configured by a PCI bus or IEEE 1394. The image bus 312 has the following devices disposed thereon. A raster image processor (RIP) 308 develops vector data such as a PDL code into a bit map image. A printer I/F 310 connects the printer engine 311 and the controller unit 313 with each other, and performs synchronous/asynchronous conversion on the image data. An image processing unit 309 corrects, processes, and edits the input image data, and performs correction of the printer and conversion of resolution with respect to the image data to be printed out. In addition, the image processing unit 309 performs rotation of the image data, and compression/decompression processing according to an encoding method such as JPEG in the case of multi-valued image data, or JBIG, MMR, and MH in the case of binary image data. The printer engine 311 converts raster image data into an image on a sheet. The activation of a print operation is triggered by a command from the CPU 301.

Figure 4:
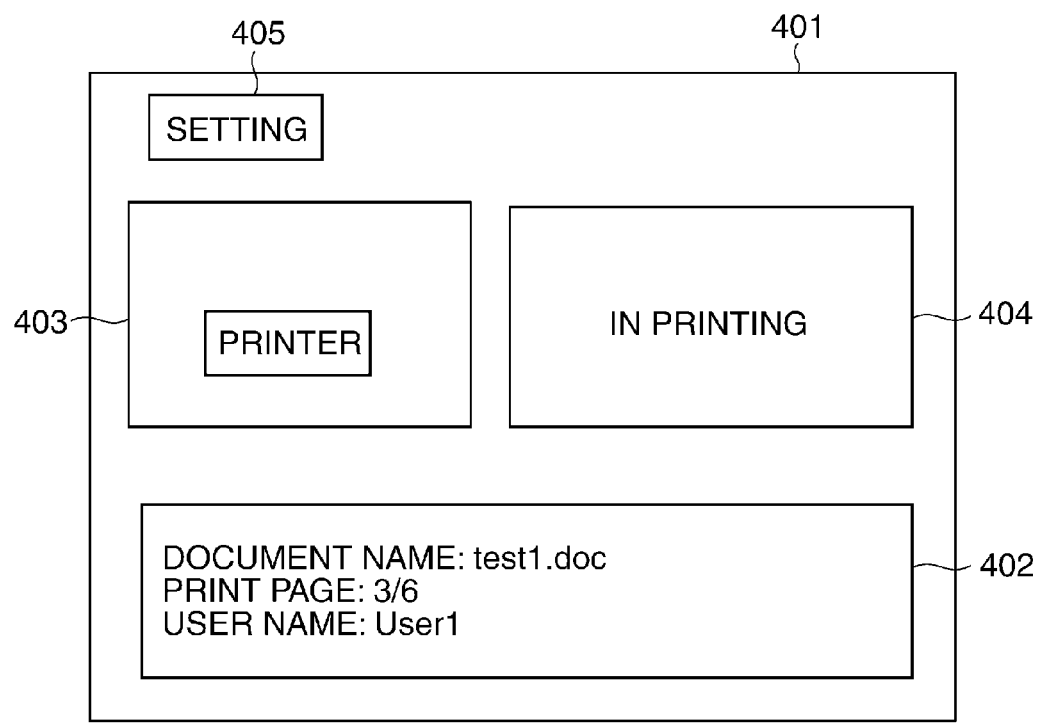
FIG. 4 is a view showing an example of a display screen due to a UI application which is operated by the PC in FIG. 1.

FIG. 4 is a view showing an example of a display screen 401 due to the UI application which is operated by the PC 102 in FIG. 1. The printer 103 is assumed as an apparatus having no operation panel. The display screen 401 due to the UI application is operated by the PC 102, which disables the operations such as inputting and setting related to the printer 103 to be performed on the screen of the PC 102. The display screen 401 due to the UI application is operated by the CPU 201 of the PC 102. The display screen 401 due to the UI application is connected to the printer 103 through the USB I/F 208 or the LAN I/F 207. When the user 101 installs the UI application, the UI application is associated with the printer 103.

The display screen 401 due to the UI application includes a job execution status display-unit 402, a device state-display unit 403, and a device state-description unit 404. The device state-display unit 403 displays a screen according to the status of the printer 103. The device state-description unit 404 displays text according to the status of the printer 103. The job execution status-display unit 402 displays the status of a print job which is performed by the device connected to the display screen 401 due to the UI application. The example of FIG. 4 shows a state in which the user "User1" enters a job having a document name of "test1.doc", with the printing completed up to 3 pages in 6 pages. When the device does not perform the printing, nothing is displayed in the job execution status-display unit 402. When a setting button 405 is pressed, the display screen 401 due to the UI application displays a function select menu and a setting dialogue according to the selected function. A displayable dialogue includes a sleep setting dialogue 701, an SNIP setting dialogue 801, a DNS setting dialogue 901, and a cloud print setting dialogue 1001 as described below (FIGS. 7 to 10).

Figure 5:
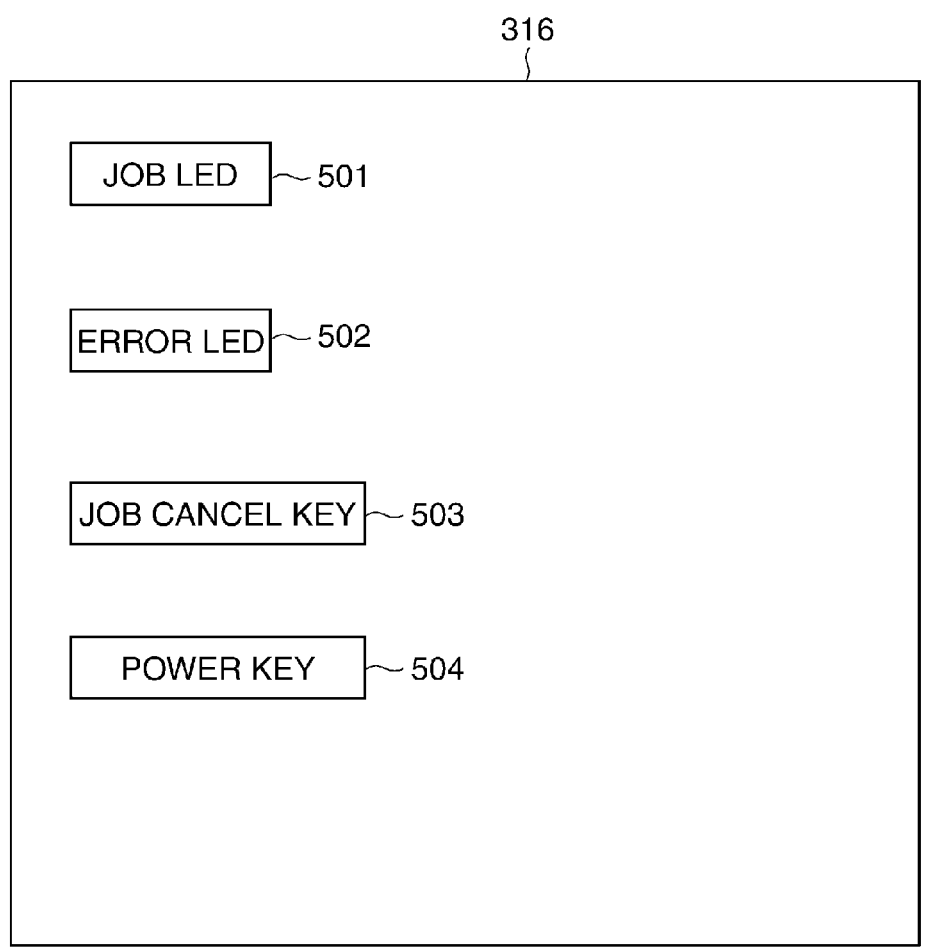
FIG. 5 is a view showing an operation unit of the printer of FIG. 3 in detail.

FIG. 5 is a view showing an operation unit 316 of the printer 103 of FIG. 3 in detail.

In FIG. 5, a job LED 501 is lit on at the time when the printer 103 holds a job. An error LED 502 is lit on at the time when the printer 103 is in an error state such as jamming or no sheets. When a job cancel key 503 is pressed, the job held by the printer 103 is erased. These operations are controlled by the CPU 301 through the operation unit I/F 315. When a power key 504 is pressed in a shutdown state, the power is supplied from the printer engine 311 to the controller unit 313 to thereby perform an activation. When the power key 504 is pressed in an activated state, the power from the printer engine 311 to the controller unit 313 is not supplied to thereby cause the printer to enter the shutdown state. In this way, the operation unit 316 is not provided with a display panel. Physical keys other than the above-exemplified keys may be provided, and these physical keys are assigned to interruption ports.

The printer 103 has a normal state and a sleep state as a power state. The sleep state is a power saving state in which the clocks are not supplied to some unused units in order to suppress power consumption, and the normal state is a non-power-saving state.

Figure 6:
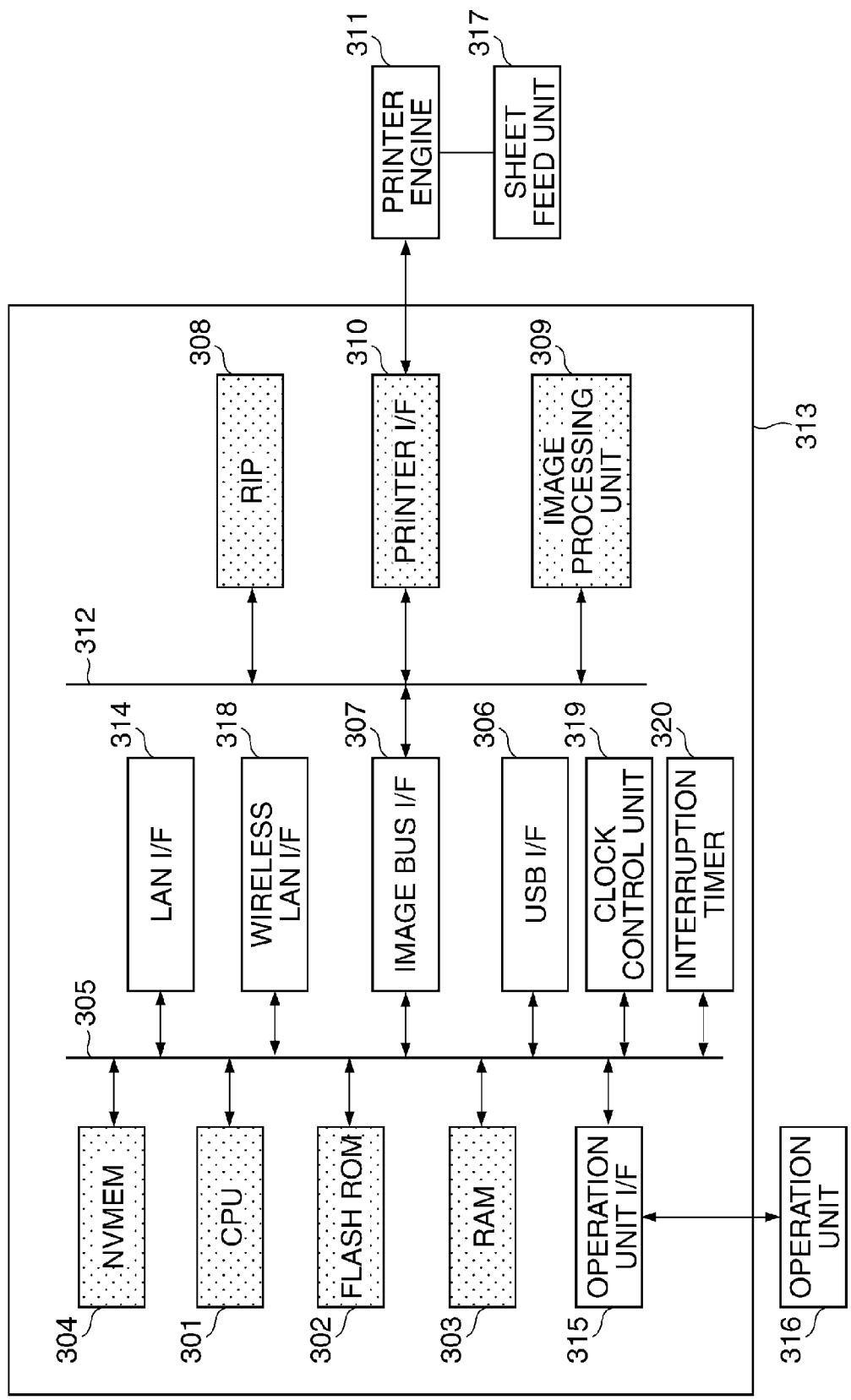
FIG. 6 is a view showing a hardware configuration of the printer in a case where a controller unit in FIG. 3 is in a sleep state.

FIG. 6 is a view showing a hardware configuration of the printer 103 in a case where the controller unit 313 in FIG. 3 is in the sleep state.

In FIG. 6, the units supplied with no clocks by the clock control unit 319 in the sleep state are represented by shading thereto. Specifically, in the sleep state, the clock control unit 319 does not supply the clocks to the NVMEM 304, the CPU 301, the flash ROM 302, the RAM 303, the RIP 308, the printer I/F 310, and the image processing unit 309. The transition to the sleep state is commanded from the CPU 301 to the clock control unit 319. On the other hand, when the clock control unit 319 is informed of the timer interruption from the interruption timer 320, the clocks start to be supplied to the above units again so as to release the sleep state, which causes the printer to return to the normal state.

Figure 7:
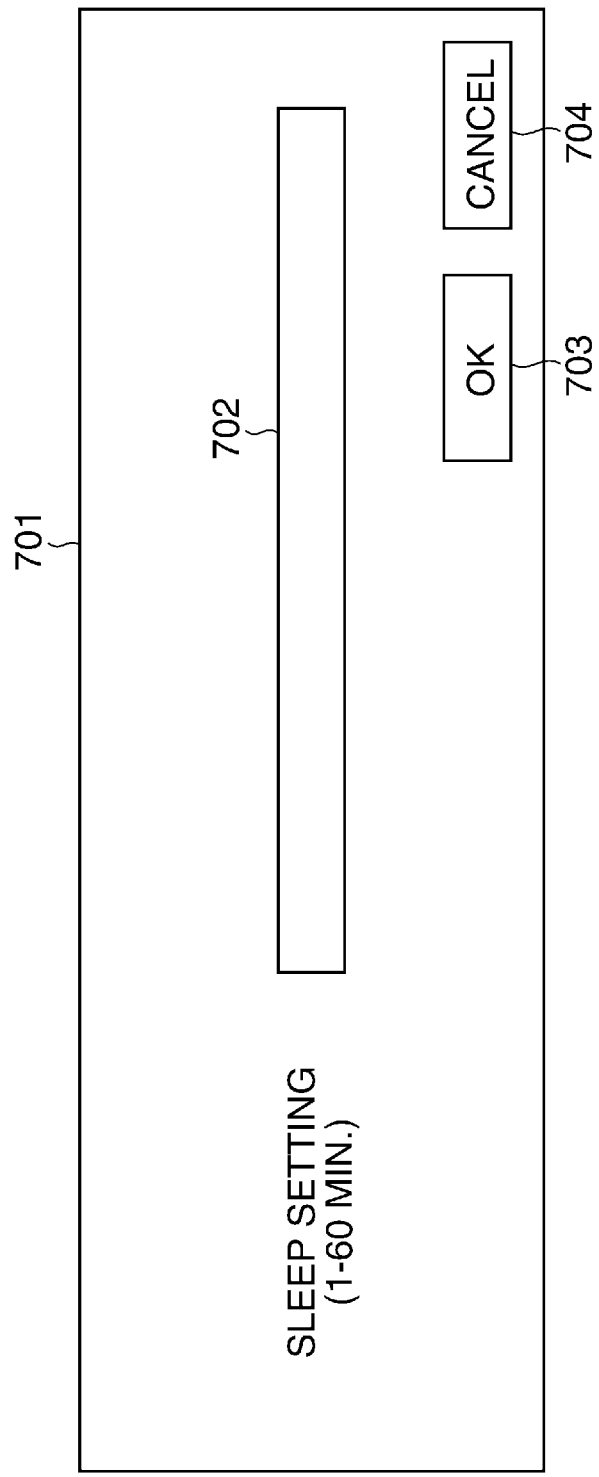
FIG. 7 is a view showing an exemplary screen of a sleep setting dialogue which is displayed in the display screen of FIG. 4.
Figure 8:
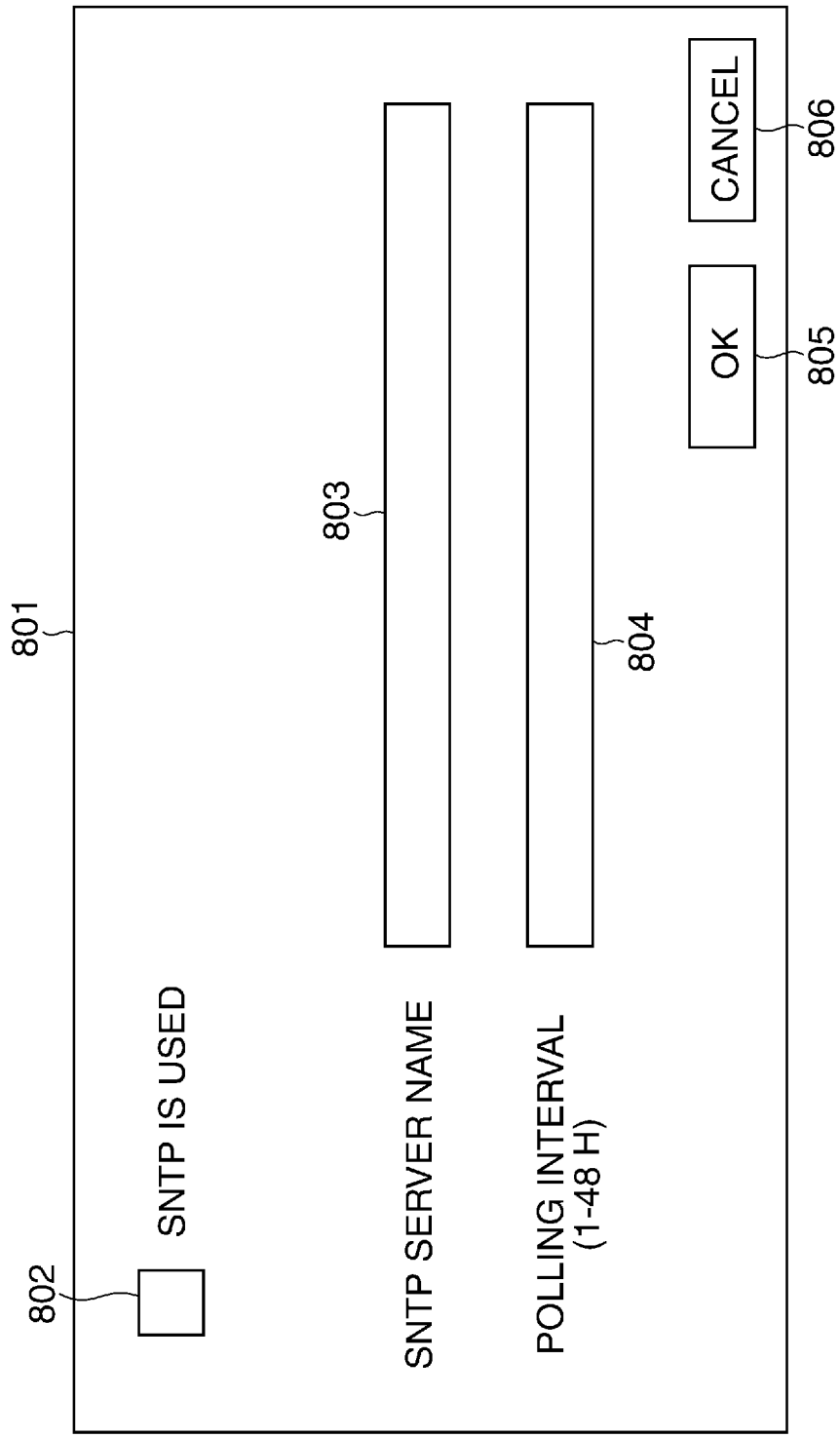
FIG. 8 is a view showing an exemplary screen of an SNIP setting dialogue which is displayed in the display screen of FIG. 4.
Figure 9:
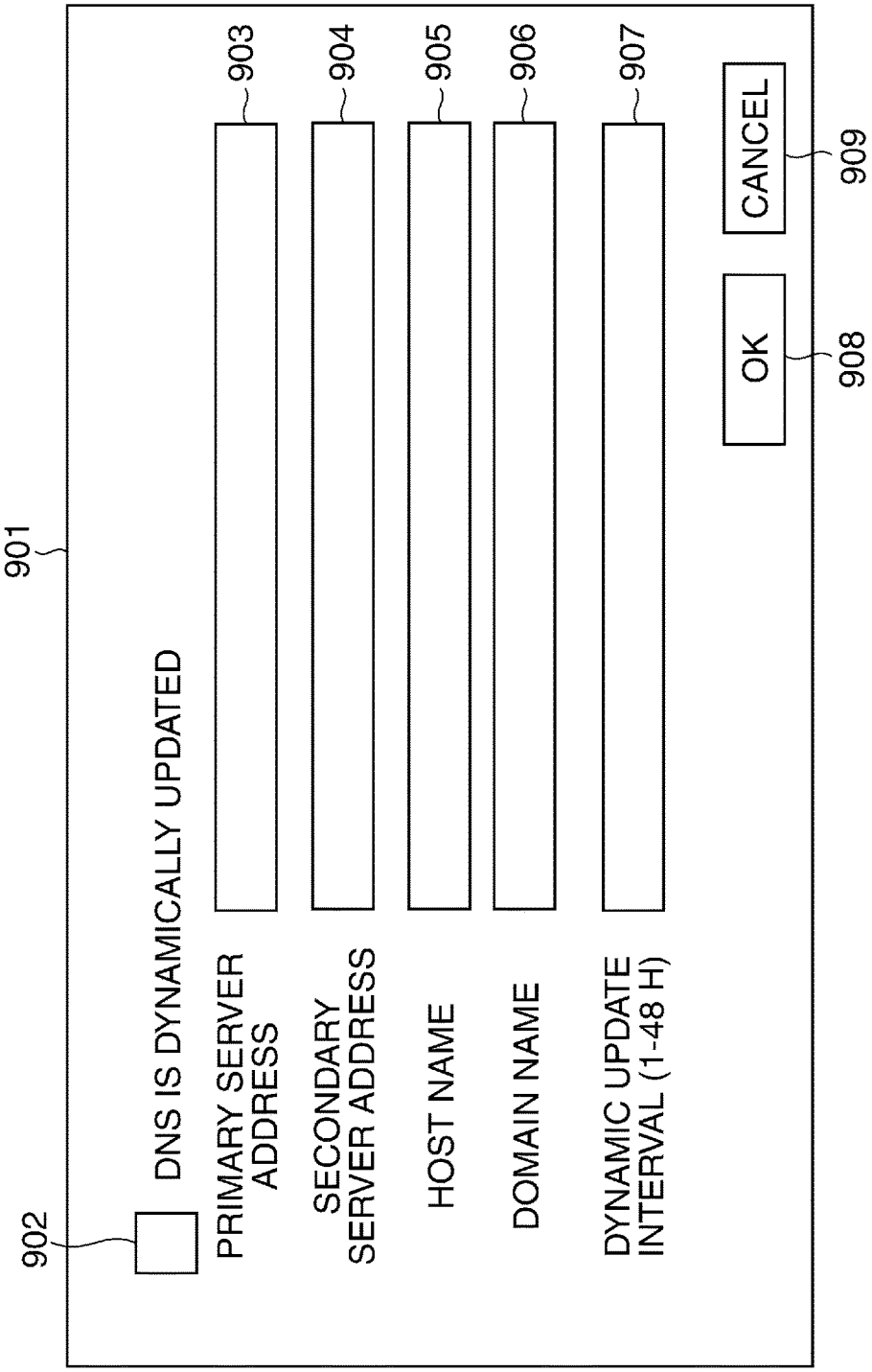
FIG. 9 is a view showing an exemplary screen of a DNS setting dialogue which is displayed in the display screen of FIG. 4.
Figure 10:
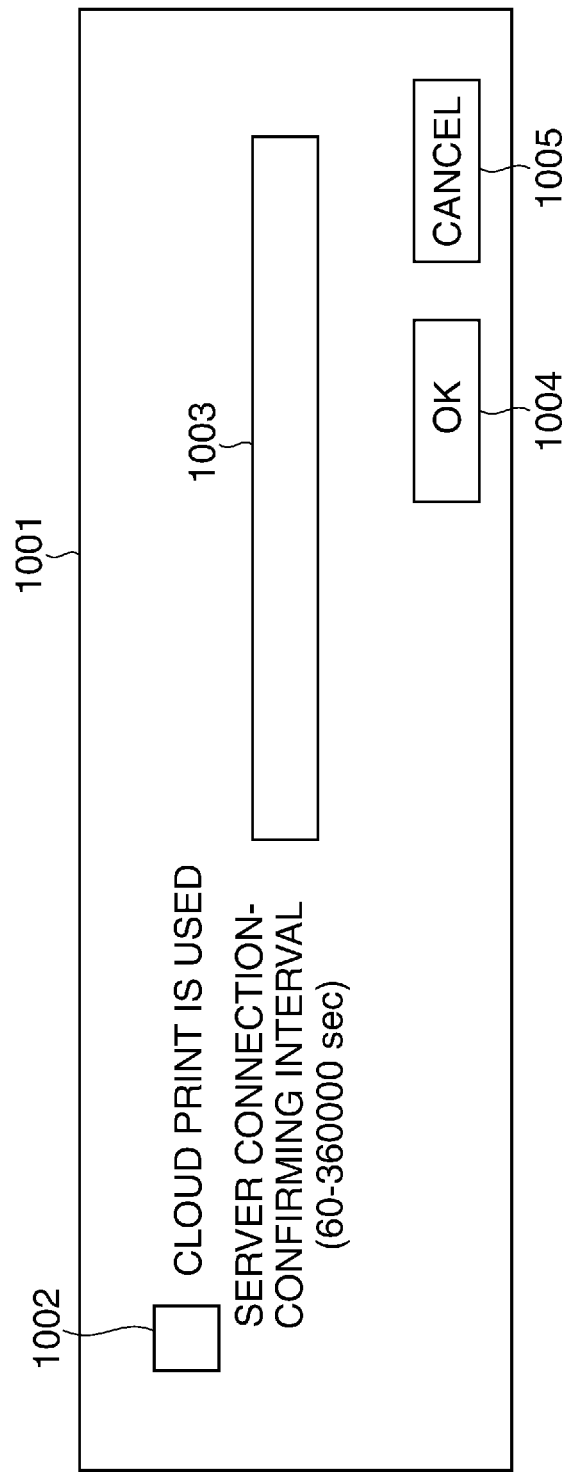
FIG. 10 is a view showing an exemplary screen of a cloud print setting dialogue which is displayed in the display screen of FIG. 4.

FIG. 7 is a view showing an exemplary screen of the sleep setting dialogue 701 which is displayed in the display screen 401 of FIG. 4, FIG. 8 is a view showing an exemplary screen of the SNIP setting dialogue 801 which is displayed in the display screen 401 of FIG. 4, FIG. 9 is a view showing an exemplary screen of the DNS setting dialogue 901 which is displayed in the display screen 401 of FIG. 4, and FIG. 10 is a view showing an exemplary screen of the cloud print setting dialogue 1001 which is displayed in the display screen 401 of FIG. 4. The displaying of these dialogues and the setting of input items held by the display screen 401 due to the UI application are controlled by the CPU 201 according to the information input through the operation unit 206 by the user 101.

First, through the sleep setting dialogue 701 (FIG. 7), the user 101 can set an arbitrary value from among 1 to 60 minutes using a sleep setting input form 702, as a time taken for the transition to the sleep state of the controller unit 313. When a sleep setting OK button 703 is pressed, the value set in the sleep setting input form 702 is transmitted to the printer 103 through the USB I/F 306 or the LAN I/F 314. The transmitted value is stored in the NVMEM 304 as a transition setting time which indicates a time taken for the transition to the sleep state. When a cancel button 704 is pressed, the sleep setting dialogue 701 is closed.

Through the SNTP setting dialogue 801 (FIG. 8), the user 101 can designate whether or not an SNTP function is activated using an SNTP check box 802 (ON/OFF). When the SNTP check box 802 is checked, the function is activated on. In an SNTP server name input form 803, an arbitrary name of a server which is communicated with the controller unit 313 can be input. In an SNTP polling interval input form 804, an arbitrary value from among 1 to 48 hours can be designated as a time interval for the communication between the controller unit 313 and the server. When an SNTP setting OK button 805 is pressed, the values set in the SNTP check box 802 and the input forms 803 and 804 are transmitted to the printer 103 through the USB I/F 306 or the LAN I/F 314. The transmitted values are stored in the NVMEM 304. When a cancel button 806 is pressed, the SNTP setting dialogue 801 is closed. In a case where the SNTP check box 802 is set to be checked, the controller unit 313 communicates with the server set in the SNTP server name input form 803 in the time interval set in the SNTP polling interval input form 804, which causes the time to be corrected, and the corrected time is stored in the NVMEM 304.

Through the DNS setting dialogue 901 (FIG. 9), the user 101 can designate whether or not a dynamic update function of the DNS is activated using a DNS dynamic update check box 902 (ON/OFF). When the DNS dynamic update check box 902 is checked, the function is activated on. In a DNS primary server address input form 903, an arbitrary address of a server which is communicated with the controller unit 313 can be input. In a DNS secondary server address input form 904, an arbitrary name of a server which is communicated with the controller unit 313 can be input. In a host name input form 905, a host name to be registered in the DNS server can be input. In a domain name input form 906, a domain name to be registered in the DNS server can be input. In a dynamic update interval input form 907, an arbitrary value from among 1 to 48 hours can be designated as a time interval for the communication between the controller unit 313 and the DNS server.

When a DNS setting OK button 908 is pressed, the values set in the DNS dynamic update check box 902 and the input forms 903, 904, 905, 906, and 907 are transmitted to the printer 103 through the USB I/F 306 or the LAN I/F 314. The transmitted values are stored in the NVMEM 304. When a cancel button 909 is pressed, the DNS setting dialogue 901 is closed. In a case where the DNS dynamic update check box 902 is set to be checked, the controller unit 313 communicates with the server (the DNS server) set in the input form 903 or 904 in the time interval set in the dynamic update interval input form 907. Then, the controller unit 313 transmits the values set in the input forms 905 and 906 and the IP address of its own to the server. When the transmission is implemented, the time of the last time transmission is stored in the NVMEM 304.

In the cloud print-setting dialogue 1001 (FIG. 10), the user 101 can designate whether or not a cloud print function is activated using a cloud print check box 1002 (ON/OFF). When the cloud print check box 1002 is checked, the function is activated on. The cloud print function includes the Google (Registered Trademark) cloud print.

In a server connection-confirming interval-input form 1003, a time interval during which the connection between the controller unit 313 and the cloud server is confirmed can be designated. When a cloud print-setting OK button 1004 is pressed, the values set in the cloud print check box 1002 and the server connection-confirming interval-input form 1003 are transmitted to the printer 103 through the USB I/F 306 or the LAN I/F 314. The transmitted values are stored in the NVMEM 304. When a cancel button 1005 is pressed, the cloud print-setting dialogue 1001 is closed. In a case where the cloud print check box 1002 is set to be checked, the controller unit 313 confirms the connection for session with the cloud server in the time interval set in the server connection-confirming interval-input form 1003. When the connection is confirmed, the time when the connection is finally confirmed is stored in the NVMEM 304. As a result of the confirmation on the connection, in a case where there is a problem in the connection, the controller unit 313 restarts the communication from the beginning.

Figure 11:
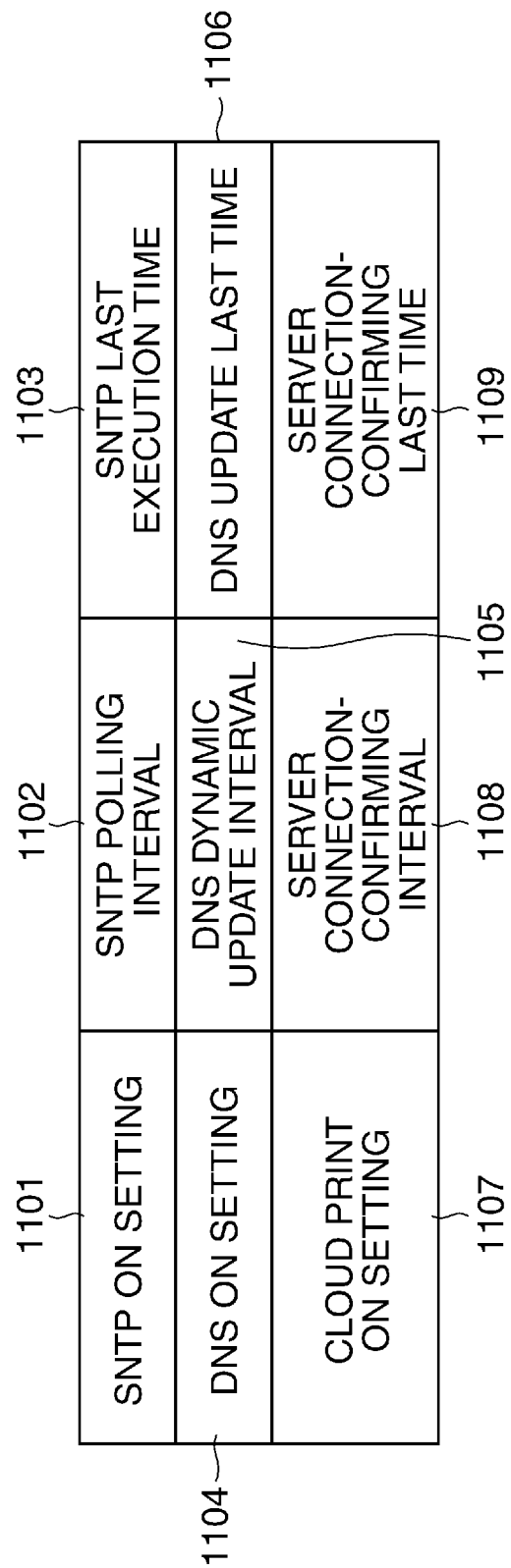
FIG. 11 is a view showing some of values stored in a NVMEM in FIG. 6.

FIG. 11 is a diagram illustrating some of the values stored in the NVMEM 304 in FIG. 6.

In FIG. 11, a value indicating whether or not the SNIP function is activated (ON/OFF) is stored in an SNIP ON setting 1101. The value (the polling interval) input from the SNIP polling interval-input form 804 is stored in an SNIP polling interval 1102. In an SNIP last execution time 1103, a last time (the SNIP last execution time) when the controller unit 313 lastly communicates with the SNIP server with the time corrected is stored.

In a DNS ON setting 1104, the value indicating whether or not the dynamic update function of the DNS is activated (ON/OFF) is stored. In a DNS dynamic update interval 1105, the value (the dynamic update interval) input in the dynamic update interval-input form 907 is stored. In a DNS update final time 1106, the time (the DNS update final time) when the controller unit 313 lastly transmits the values set in the input forms 905 and 906 (FIG. 9) and the IP address of its own to the DNS server is stored.

In a cloud print ON setting 1107, the value indicating whether or not the cloud print function is activated (ON/OFF) is stored. In a server connection-confirming interval 1108, the value (the server connection confirming interval) input in the server connection-confirming interval-input form 1003 is stored. In a server connection-confirming last time 1109, the time (the server connection-confirming last time) when the controller unit 313 lastly confirms the connection for session with the cloud server and the session is stored.

Figure 12:
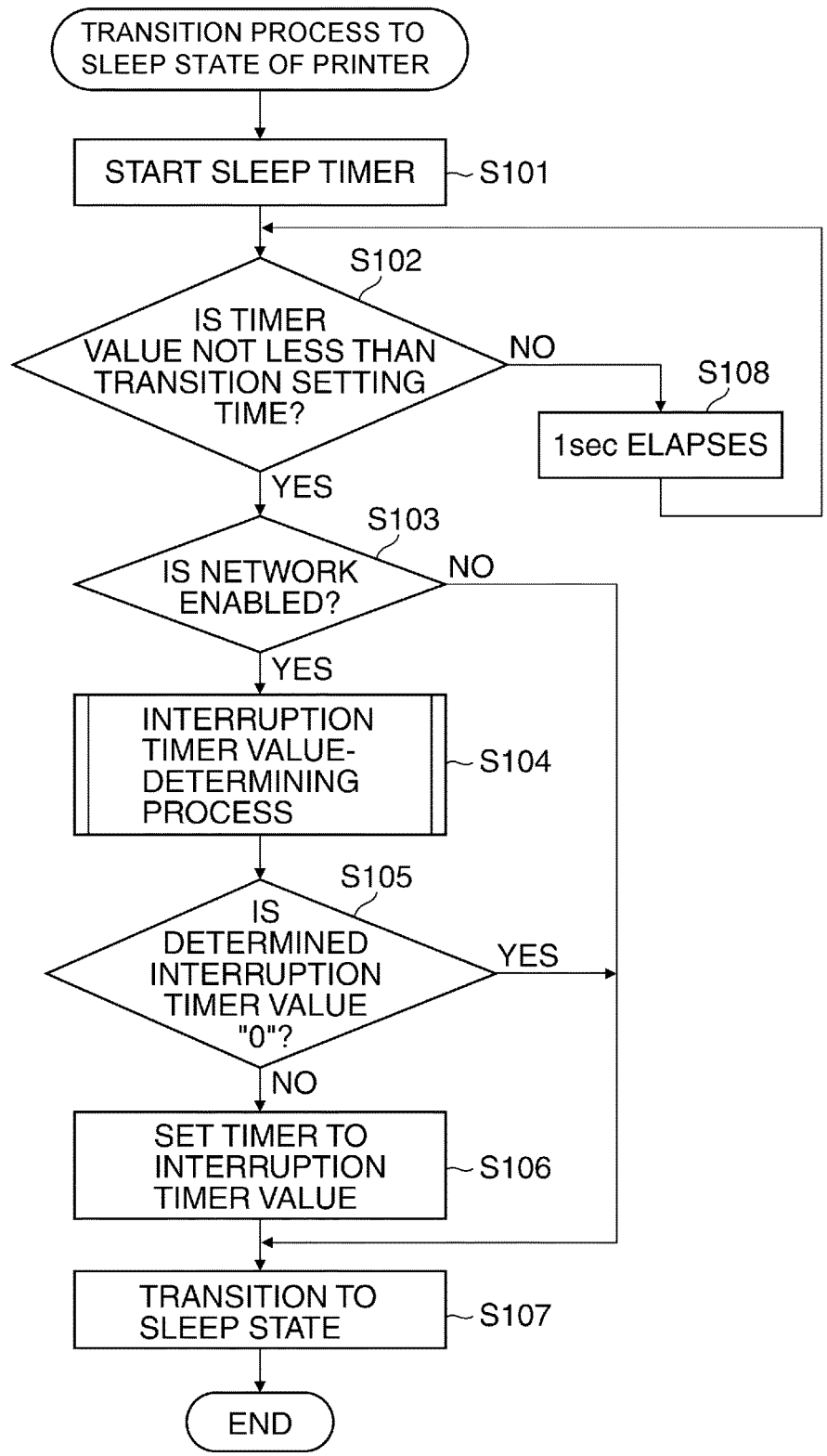
FIG. 12 is a flowchart showing a transition process of the PRINTER in FIG. 1 to the sleep state.

FIG. 12 is a flowchart showing a transition process of the PC in FIG. 1 to the sleep state.

The process of FIG. 12 is performed by the CPU 301 when the printer 103 is in a standby state in which the process such as the printing is not performed.

In FIG. 12, first, the CPU 301 causes the sleep timer to start counting time (step S101). Next, in step S102, the CPU 301 compares the counted sleep timer value with the transition setting time which is input as a time taken for the transition to the sleep state in the sleep setting input form 702 and stored in the NVMEM 304. Then, the CPU 301 determines whether or not the sleep timer value is not less than the transition setting time. As a result of the determination of the step S102, in a case where the sleep timer value is less than the transition setting time (NO to step 102), the CPU 301 performs the process of the step S102 again after 1 second elapses (step S108), whereas in a case where the sleep timer value is not less than the transition setting time (YES to step S102), the process proceeds to step S103.

In the step S103, the CPU 301 determines whether the network 104 is enabled (that is, whether the server 105 is enabled to communicate through the LAN I/F 314 or the wireless LAN I/F 318). As a result of the determination of the step S103, in a case where the LAN I/F 314 and the wireless LAN I/F 318 are not used and the network 104 is not enabled, the CPU 301 issues a command to the clock control unit 319 to cause the printer 103 to transition to the sleep state (step S107). In this case, the printer transitions to the sleep state without setting an interrupt timer value (described below using FIG. 13) to the timer 320, followed by the process of FIG. 12 terminating. On the other hand, in a case where the LAN I/F 314 or the wireless LAN I/F 318 is used and the network 104 is enabled, the CPU 301 performs an interrupt timer value-determining process of FIG. 13, described below, to determine the interruption timer value which is set to the timer 320 (step S104).

Next, the CPU 301 determines in step S105 whether or not the interruption timer value set in the step S104 is "0". In a case where the interruption timer value is "0", the process proceeds to Step S107. In this case, the printer transitions to the sleep state without the interrupt timer value set. On the other hand, in a case where the interruption timer value is not "0", the CPU 301 sets the interruption timer 320 to the set interrupt timer value (step S106), followed by the process proceeding to the step S107. In this case, the printer transitions to the sleep state with the interruption timer value set.

Figure 13:
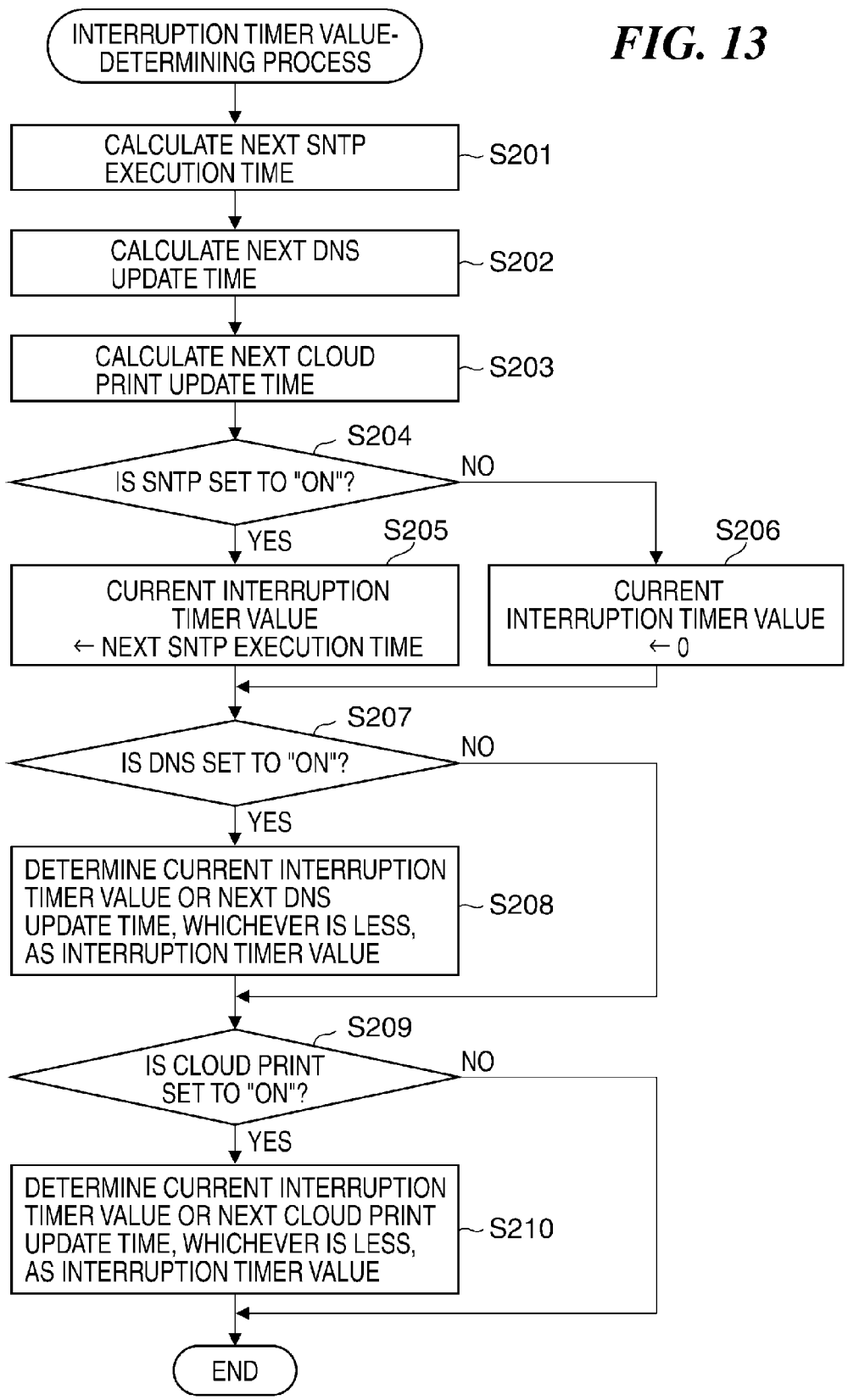
FIG. 13 is a flowchart showing an interruption timer value-determining process which is performed in step S104 of FIG. 12.

FIG. 13 is a flowchart showing the interruption timer value-determining process which is performed in the step S104 of FIG. 12. This process is performed in the step S104 of FIG. 12.

First, the CPU 301 calculates a next SNTP polling execution time, that is, a time taken for the next SNTP polling from the current time (step S201). The next SNTP polling execution time is a remaining time before the next periodic communication by the SNTP function is executed. The CPU 301 calculates the next SNTP polling execution time based on the polling interval stored in the SNTP polling interval 1102, the SNTP last execution time stored in the SNTP final execution time 1103, and the current time. For example, assuming that the polling interval is 1 hour, the SNTP last execution time is 12:00 Jan. 1, 2015, and the current time is 12:30 Jan. 1, 2015, the next SNTP polling execution time becomes 30 minutes later.

Next, the CPU 301 calculates a next DNS update time which is a remaining time before the next periodic communication by the DNS function is executed (that is, a time taken for the next dynamic update of the DNS from the current time) (step S202). The CPU 301 calculates the next DNS update time based on the dynamic update interval stored in the DNS dynamic update interval 1105, the DNS update last time stored in the DNS update final time 1106, and the current time. For example, assuming that the DNS dynamic update interval is 2 hours, the DNS update last time is 12:15 Jan. 1, 2015, and the current time is 12:30 Jan. 1, 2015, the next DNS update time becomes 1 hour and 45 minutes later.

Next, the CPU 301 calculates a next cloud print update time which is a remaining time before the next periodic communication by the cloud print function is executed (that is, a time taken for the next confirmation on the connection for session with the cloud server and the session from the current time) (step S203). The CPU 301 calculates the next cloud print update time based on the server connection-confirming interval stored in the server connection-confirming interval 1108, the server connection-confirming last time stored in the server connection-confirming last time 1109, and the current time. For example, assuming that the server connection-confirming interval is 60 seconds (1 minute), the server connection-confirming final time is 12:30 Jan. 1, 2015, and the current time is 12:30 Jan. 1, 2015, a time of performing the confirmation on the connection for session with the cloud server becomes 1 minute later.

Next, the CPU 301 determines whether or not the SNIP ON setting 1101 is set to "ON" (Step S204). As a result of the determination of the step S204, in a case where the SNIP ON setting 1101 is set to "ON", the CPU 301 determines the next SNIP polling execution time calculated in Step S201 as the interruption timer value (step S205). On the other hand, in a case where the SNIP ON setting 1101 is not set to "ON", the CPU 301 determines the interrupt timer value as "0" (step S206).

After the steps S205 and S206, the CPU 301 determines whether or not the DNS ON setting 1104 is set to "ON" (Step S207). As a result of the determination of the step S207, in a case where the DNS ON setting 1104 is set to "ON", the CPU 301 compares the next DNS update time calculated in the step S202 with the current interruption timer value. The current interruption timer value herein means an interruption timer value determined in the step S205 or S206.

Then, the CPU 301 determines the next DNS update time or the current interruption timer value, whichever is less (except "0"), as the interruption timer value (step S208), followed by the process proceeding to step S209. Accordingly, in a case where the next DNS update time is not "0" and is smaller than the current interruption timer value, the interruption timer value is updated. On the other hand, in a case where the DNS ON setting 1104 is not set to "ON", the process proceeds to the step S209 while skipping the step S208, which causes the interruption timer value of the current time to be maintained as it is.

In the step S209, the CPU 301 determines whether or not the cloud print ON setting 1107 is set to "ON". As a result of the determination of the step S209, in a case where the cloud print ON setting 1107 is set to "ON", the CPU 301 compares the next cloud print update time calculated in the step S203 with the current interruption timer value. The interruption timer value of the current time herein is the interrupt timer value calculated in the step S205 or S206, or the interruption timer value updated in the step S208.

Then, the CPU 301 determines in the next cloud print update time and the current interruption timer value, whichever is less (except "0"), as the interruption timer value (Step S210), followed by terminating the process of FIG. 13. Accordingly, in a case where the next cloud print update time is not "0" and is smaller than the current interruption timer value, the interruption timer value is updated. On the other hand, in a case where the cloud print ON setting 1107 is not set to "ON", the process of FIG. 13 is terminated while skipping the step S210, which causes the current interruption timer value to be maintained as it is.

According to the process of FIG. 13, it is possible to determine, when the printer transitions to the sleep state, and the interruption timer value based on the shortest time from among the next SNIP polling execution time, the next DNS update time, and the next cloud print update time. In other words, consideration of the use status of the network 104 enables the interruption timer value to be determined according to an enabled function coming at the earliest execution timing from among the functions of periodically communicating with the server 105. In a case where all the functions are not set to be enabled, the interruption timer value is determined to "0".

Then, according to the process of FIG. 12, the determined interruption timer value is set to the interruption timer 320 at the time of the transition to the sleep state. In the sleep state, when a time defined by the interruption timer value set by the interrupt timer 320 elapses, the printer transitions to the normal state with the sleep state released.

According to the embodiment of the invention, the remaining time before the next periodic communication is executed is calculated based on the execution time of the previous periodic communication by the function of periodically communicating with the server 105 and the current time, and then the interruption timer value is set based on the remaining time, when the power state transitions to the sleep state. Therefore, it is possible to dynamically determine the next communication timing with the server 105, thereby preventing the sleep state from being unnecessarily released to thereby improve a power saving effect. In addition, in a case where there is a plurality of functions set to be enabled, the interrupt timer value is set based on the shortest time from among the remaining times calculated each for the enabled functions, which enables the sleep state to be kept on until the earliest, necessary communication timing comes to thereby increase the power saving effect.

In addition, since the user can set the communication periodically performed with the server 105 to be enabled/disabled, it is possible to appropriately determine the next communication timing according to the enabled/disabled state of the function periodically communicating with the server 105. In addition, since the user can set the time interval of the periodic communications of the functions, it is possible to appropriately determine the next communication timing according to the setting of the time interval of each function.

In addition, the operational input of the user through the UI application 401 operated by the PC 102 can be reflected to the setting on the function of the printer 103, which appropriately makes the setting of the device without providing soft keys of a touch panel in the printer 103 to thereby reduce the physical keys. As a result, it is possible to easily assign all the physical keys to the interrupt ports, which eliminates the need for the transition from the sleep state to the normal state only for detecting a key pressing. The invention is suitable particularly to the such printer 103.

Further, the remaining time before the execution time of the next periodic communication from the current time is exemplified as the interrupt timer value, but any value may be used so long as the value can define the execution time of the next periodic communication, and the invention is not limited thereto. For example, a relative time point to a predetermined time may be used, or an absolute time point may be used.

Further, the function of periodically communicating with at least any one of the SNIP server, the DNS server, and the cloud server has been exemplified as the function of periodically communicating with the server 105, but the invention is not limited thereto. For example, the periodic communication may be performed with a DHCP (Dynamic Host Configuration Protocol) server.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-109652, filed May 29, 2015, which is hereby incorporated by reference herein in its entirety.

What is claimed is:

1. An image forming apparatus having a first power state and a second power state in which less power is used than in the first power state, and having a plurality of functions that periodically communicate with an external apparatus, the image forming apparatus comprising:
    a communication interface configured to perform communications with the external apparatus; and
    processing circuitry configured to:
        calculate a remaining time before the image forming apparatus next communicates with the external apparatus, for each of the plurality of functions that periodically communicate with the external apparatus via the communication interface;
        set, in a timer, the shortest one from among the plurality of calculated remaining times; and
        cause a power state of the image forming apparatus to transit from the second power state to the first power state according to the remaining time set in the timer.

2. The image forming apparatus according to claim 1, wherein the processing circuitry calculates the remaining time when the power state of the image forming apparatus transits from the first power state to the second power state.

3. The image forming apparatus according to claim 1, wherein the processing circuitry calculates the remaining time based on a time interval between execution time of the previous periodical communication and current time.

4. The image forming apparatus according to claim 1, wherein one of the plurality of functions with the shortest remaining time is executed when the power state of the image forming apparatus transits from the first power state to the second power state.

5. The image forming apparatus according to claim 1, wherein the processing circuitry is further configured to set each of the plurality of functions to be enabled/disabled based on a command from a user.

6. The image forming apparatus according to claim 1, wherein the processing circuitry is further configured to set a time interval of a periodical communication for each of the plurality of functions based on a command from a user.

7. The image forming apparatus according to claim 1, wherein one of the plurality of functions includes a function of periodically communicating with at least any one of an SNTP server, a DNS server, and a cloud server.

8. The image forming apparatus according to claim 1, wherein an operational input of a user through a UI application operated by an information processing apparatus connected to the image forming apparatus is able to be reflected to setting on one of the functions.

9. An image forming apparatus having a first power state and a second power state in which less power is used than in the first power state, and having a plurality of functions that periodically communicate with an external apparatus, the image forming apparatus comprising:
    a communication interface configured to perform communications with the external apparatus; and
    processing circuitry configured to:
        set, in a timer, a time point at which a power state of the image forming apparatus is to transit from the second power state to the first power state for each of the plurality of functions; and
        cause a power state of the image forming apparatus to transit from the second power state to the first power state at the time of a time point set in the timer.

10. The image forming apparatus according to claim 9, wherein the processing circuitry is further configured to set each of the plurality of functions to be enabled/disabled based on a command from a user.

11. The image forming apparatus according to claim 9, wherein the processing circuitry is further configured to set a time interval of a periodical communication for each of the plurality of functions based on a command from a user.

12. The image forming apparatus according to claim 9, wherein one of the plurality of functions includes a function of periodically communicating with at least any one of an SNTP server, a DNS server, and a cloud server.

13. The image forming apparatus according to claim 9, wherein an operational input of a user through a UI application operated by an information processing apparatus connected to the image forming apparatus is able to be reflected to setting on one of the functions.

14. A control method of an image forming apparatus having a first power state and a second power state in which less power is used than in the first power state, and having a plurality of functions that periodically communicate with an external apparatus, the method comprising:
    calculating a remaining time before the image forming apparatus next communicates with the external apparatus, for each of the plurality of functions that periodically communicate with the external apparatus;
    setting, in a timer, the shortest one from among the plurality of calculated remaining times; and
    causing a power state of the image forming apparatus to transit from the second power state to the first power state according to the remaining time set in the timer.

15. A control method of an image forming apparatus having a first power state and a second power state in which less power is used than in the first power state, and having a plurality of functions that periodically communicate with an external apparatus, the method comprising:
setting, in a timer, a time point at which a power state of the image forming apparatus is to transit from the second power state to the first power state, for each of the plurality of functions; and
causing a power state of the image forming apparatus to transit from the second power state to the first power state at the time of a time point set in the timer.

* * * * *